(12) United States Patent
Little et al.

(10) Patent No.: US 9,924,706 B2
(45) Date of Patent: Mar. 27, 2018

(54) SYSTEM AND METHODS FOR PEST REDUCTION

(71) Applicant: Mississippi State University, Starkville, MS (US)

(72) Inventors: Nathan S. Little, Starkville, MS (US); John J. Riggins, Starkville, MS (US); Tor P Schultz, Starkville, MS (US)

(73) Assignee: Mississippi State University, Mississippi State, MS (US)

( * ) Notice: Subject to any disclaimer, the term of this patent is extended or adjusted under 35 U.S.C. 154(b) by 8 days.

(21) Appl. No.: 13/893,051

(22) Filed: May 13, 2013

(65) Prior Publication Data

US 2013/0333275 A1    Dec. 19, 2013

Related U.S. Application Data

(60) Provisional application No. 61/646,005, filed on May 11, 2012.

(51) Int. Cl.
*A01M 1/02* (2006.01)
*A01M 1/20* (2006.01)

(52) U.S. Cl.
CPC ............ *A01M 1/2011* (2013.01); *A01M 1/02* (2013.01)

(58) Field of Classification Search
CPC ............ A01M 1/00; A01M 1/02; A01M 1/20; A01M 1/2011
USPC .................... 43/107, 121, 124, 131, 132.1
See application file for complete search history.

(56) References Cited

U.S. PATENT DOCUMENTS

| | | | |
|---|---|---|---|
| 3,070,495 A | | 12/1962 | Esenther et al. |
| 4,363,798 A | * | 12/1982 | D'Orazio .................. 424/84 |
| 4,504,468 A | * | 3/1985 | Brill et al. .................. 424/617 |
| 4,530,834 A | * | 7/1985 | McCabe et al. ............ 424/93.5 |
| 5,360,607 A | * | 11/1994 | Eyal et al. .................. 424/93.5 |
| 6,093,389 A | * | 7/2000 | Galinis et al. .............. 424/84 |
| 6,203,811 B1 | * | 3/2001 | McPherson et al. ........ 424/405 |
| 7,122,176 B2 | * | 10/2006 | Stamets ................ A01N 63/04 |
| | | | 424/195.15 |
| 8,574,566 B2 | * | 11/2013 | Prenerova et al. ......... 424/93.5 |

FOREIGN PATENT DOCUMENTS

| WO | WO 94/04034 | * | 3/1994 |
| WO | WO 2010/009542 | * | 1/2010 |

OTHER PUBLICATIONS

"Observations of Termite-Fungus Interactions of Potential Signifance to Wood Biodeterioration and Protection", Andrew H.H. Wong and K.S. Cheok of the Forest Research Institue Malaysia, Jun. 22, 2001, Timber Technology Bulletin No. 24, 2001. <retrieved from the internet on Apr. 21, 2015>.*

(Continued)

*Primary Examiner* — David J Parsley
(74) *Attorney, Agent, or Firm* — Butler Snow LLP

(57) ABSTRACT

The present invention includes a new type of bait for wood-targeting pest baiting systems and methods of obtaining the bait. Certain embodiments of the present invention include a blue-stained wood either treated with a solution that includes blue-stain fungi or wood naturally infected with blue-stain fungi. Additional embodiments of the present invention include a blue-stained solution that may be applied to a wood substrate or to a non-wood bait matrix.

10 Claims, 3 Drawing Sheets

(56) References Cited

OTHER PUBLICATIONS

Potter, Michael F. "Termite Baits: a Guide for Homeowners", University of Kentucky College of Agriculture, Department of Entomology, website: "www2.ca.uky.edu/entomology/entfacts/ef639.asp".
Twumasi, Peter et al., The rot fungus *Botryodiplodia theobromae* strains cross infect cocoa, mango, banana and yam with significant tissue damage and economic losses. African Journal of Agricultural Research, vol. 9(6), pp. 613-619, Feb. 6, 2014.
Michael J. Wingfield, et al., "Novel associations between ophiostomatoid fungi, insects and tree hosts: current status-future prospects", Biol Invasions DOI 10.1007/s10530-017-1468-3, Springer, published Jun. 9, 2017.
M.B. Meah, et al., "Growth and infectivity of Botryodiplodia theobromae causing stem-end rot of mango", Mycol. Res 95 (4): 405-408 (1991).
Monique L. Sakalidis, et al., "Endophytes as potential pathogens of the baobab species *Adansonia gregorii*: a focus on the Botryosphaeriaceae", Fungal Ecology 4 (2011) pp. 1-14.
Keith A. Seifert, et al., "Ceratocystis and Ophiostoma Taxonomy, Ecology, and Pathogenicity", The American Phytopathological Society, St. Paul, Minnesota, Chapter 16, pp. 141-151.
Bernard Slippers, et al., "Botryosphaeriaceae as endophytes and latent pathogens of woody plants: diversity, ecology and impact", Fungal Biology Reviews 21 (2007) pp. 90-106.

\* cited by examiner

```
Start → | Identifying a carrier of the blue-stained fungus 202 | → | Obtaining a sample of fungus from the carrier of the blue-stained fungus 204 | → | Isolating blue-stain fungus from the sample of fungus 206 | → | Growing a pure culture of blue-stain fungus 208 | → | Using the blue-stain fungus as a wood-targeting pest attractant 210 | → End
```

200

SYSTEM AND METHODS FOR PEST REDUCTION

CROSS REFERENCE TO RELATED PATENTS

This application claims the benefit of U.S. Provisional Application No. 61/646,005 filed May 11, 2012.

STATEMENT REGARDING FEDERALLY SPONSORED RESEARCH

This invention was made with government support under 0217528 awarded by the National Institute of Food and Agriculture, USDA. The government has certain rights in the invention.

FIELD OF THE INVENTION

The present invention relates generally to reducing pests. More specifically, the present invention relates to reducing pests that harm wooden products or wooden structures.

BACKGROUND OF THE INVENTION

Homeowners, industrial property owners, commercial property owners, and other property managers often have to deal with property pests. Generally, a pest is any organism detrimental to humans or human concerns. For purposes of this application, a "property pest" is an organism that is or can be detrimental to property including personal property (e.g., products) or real estate property (e.g., land or structures). Property pests include pests that cause damage to wooden products or wooden structures, pests that invade property, parasite pests, and pest vectors of disease.

Certain embodiments of the present invention are configured to reduce pests that cause damage to wooden products or wooden structures. Examples of such pests include termites such as subterranean termites, drywood termites, and dampwood termites, silverfish, woodworms, carpenter ants, red imported ants, carpenter bees, wood-eating cockroaches, and powderpost beetles. For purposes of this application, pests that cause harm to wood products or wooden structures are termed "wood-targeting pests". For purposes of this application, the naturally occurring wood plants, wood products, or wood structures that a wood-targeting pest may harm are collectively termed a "wood target".

Also, for purposes of this application, the present invention is discussed in reference to termites, but the discussion is merely exemplary. The present invention is applicable to any wood-targeting pests.

Many wood-targeting pests live in colonies. Colony members may be divided into castes, and each caste is responsible for a certain division of labor for the colony. For example, termites may include a reproductive caste, worker caste, and soldier caste. The reproductive caste may include a queen termite, king termite, or other supplementary reproductive members. The worker termites build and maintain the nest of the colony, care for the young termites, leave the nest to find food, store food, and may do some nest defense tasks. The soldier termites defend the nest against attack, possibly by ants.

Termites and other wood-targeting pests can cause massive damage to property products and property structures. People spend billions of dollars every year to control wood-targeting pests and to mitigate damage done by such pests. Accordingly, many apparatuses and approaches for decreasing the damage of the wood-targeting pests have been developed. However, such currently available apparatuses are associated with certain disadvantages.

One approach designed to address wood-targeting pests includes what is called "barrier approach", in which a liquid termiticide is applied, sometimes, by drilling into the soil, drywall, concrete slabs, or other potential points of entry for wood-targeting pests. Examples of termiticide include sulfuramid, diflubenzuron, noviflumuron, and hydramethylnon. While this approach may be effective in certain situations, if the termiticide does not sufficiently penetrate into the surfaces around the point of entry, the termites may circumvent the termiticide. In addition, a property owner may not wish to use the termiticide approach if the property includes a well, cistern, nearby pond or stream, plenums, sub-slab heating ducts, drainage systems, crawl spaces, or other underground features because the termiticide may contaminate such areas. In addition, a property owner may not wish to have holes drilled into the property structure.

Another approach for decreasing damage by wood-targeting pests, which does not require, though may be used in conjunction with the barrier approach, is a baiting approach. Such a baiting approach includes using a baiting apparatus which includes bait to attract, for example, termites to the apparatus. Examples of bait may include natural wood products, processed cellulosic products, or other synthetic products that a termite may eat. Instead of damaging a wood target, the termites damage the wooden bait in the baiting apparatus instead. However, even though such apparatuses redirect the termites away from the wood target for a period of time, the apparatus also provides food for the termites and possibly bolsters the colony of termites.

To overcome this limitation, certain baits have been impregnated with a pesticide, for example, a termiticide. Certain chemical pesticides or termiticides kill the termite before it can return to the colony. Clearly, such chemical pesticides or termiticides are limited in value since some wood-targeting pests never leave the colony, and accordingly, will never be susceptible to such pesticides.

Other chemical pesticides used in a baiting apparatus are configured to kill the termites slowly such that the worker termites can ingest the pesticide, carry it back to the colony, and feed it to the other termites in the colony.

Additional embodiments of bait apparatuses include a feeding stimulant or attractant to improve the attractiveness of the bait apparatus to a worker termite. Adding a stimulant or attractant is valuable because the success of a baiting apparatus is dependent upon a termite finding and consuming the bait food source. Typically, worker termites have very few visual capabilities and, in order to locate food sources, rely on a sense of touch and chemical signals to help them locate food. Examples of feeding stimulants or attractants include sugar, wheat-germ, bran, and other natural products. However, such attractants often appeal to a broad range of insects and organisms and are not limited to attracting termites or other wood-targeting pests.

One attractant directed to enticing termites specifically is a wood-decaying fungus, such as brown-rot known as *Lenzites trabea* or *Gloeophyllum trabeum*. Such fungus causes decay of the bait wood, and, in the early stages of decay, termites are drawn to the bait wood. A metabolite extracted from the brown-rot decaying wood also may be used as an attractant. However, such attractants may be limited in range of effectiveness, especially if the bait apparatus is positioned in the soil. In addition, certain types of termites, specifically, the highly destructive *Coptotermes* termites, are only attracted to the brown-rot decaying wood in the early stages of decay, but not overly decayed wood.

While certain other bait apparatuses have attempted to use other types of fungi—e.g., white-rot and soft-rot fungi—as an attractant, research shows that some of these fungi actually repel the termites, thereby undermining the desired effect.

Another disadvantage of using wood decay-causing fungi in a bait apparatus is that the wood decay-causing fungi may be released from the bait apparatus. Upon release, the wood decay-causing fungi could possibly infect non-bait wood, such as man-made wood products or wood structures, trees, bushes, or other natural wood organisms. Such spread of the decay not only threatens the non-bait wood, but also may attract termites to those objects as well, and accordingly, only worsen the threats to the wood targets and natural wood objects.

Clearly, there is a demand for an improved bait and attractant configured specifically to attract wood-targeting pests that have a long-lasting effect without threatening nearby wood-based objects. The present invention satisfies this demand.

SUMMARY OF THE INVENTION

Certain embodiments of the present invention include a wood-targeting pest feeding stimulant and attractant. More specifically, the present invention includes a blue-stained wood or blue-stain fungus. Advantageously, such stimulant and attractant is non-decaying fungal product useful for termite control.

Blue-stain fungi are members of the Phylum Ascomycota (also called sac fungi), which is the largest phylum of fungi. Some of the most common genera of blue-stain fungi are *Ophiostoma, Ceratocystis, Leptographium*, and *Grossmania*. Blue-stain fungi are usually symbiotically associated with above-ground bark-beetles (e.g., genera *Dendroctonus* and *Ips*) and below-ground root feeding weevils (e.g., *Hylastes* and *Hylobius*) in the insect Order Coleoptera. These bark beetles and root weevils are phloem feeding insects. Adult beetles attack trees (usually pine trees) by boring through the bark and laying eggs in the inner bark, or phloem tissue. The adult beetles and their larvae then feed in the phloem tissue, effectively girdling the tree. During attack, bark beetles also inoculate the host tree with various species of blue-stain fungi. Blue-stain fungal spores are carried on the beetles' exoskeletons or on the exoskeletons of phoretic mites that are transported to and from trees by bark beetles.

Unlike feeding existing stimulants and attractants derived from wood-decaying fungi, blue-stain fungi do not degrade structural components of wood (i.e., cellulose, hemicellulose, and lignin), and therefore do not impart any losses in strength to wood. The active release of decay fungi as attractants in termite baiting systems in existing bait apparatuses was a major limitation to their effectiveness. Consumers may be skeptical of using a wood destroying organism (decay fungi) to improve the control of another wood destroying organism (termites). Blue-stained wood has a lower economic value than unstained wood; however, this is solely due to lack of aesthetic appeal to consumers as no structural degradation is associated with blue-staining fungi.

In certain embodiments, blue-stain fungi can be obtained by isolating and identifying blue-stain fungal strains from carriers, including the bodies of bark beetles and other closely related groups such as root-feeding weevils, phoretic mites, or from infected wood tissues. After isolation and identification, pure cultures can be grown on agarose media in the lab, or prepared and stored. These isolates can then be grown in an incubator on solid or liquid agarose media, and inoculated onto non-wood, wood, or wood derivatives (paper, cardboard, cellulose, etc . . . ), which can subsequently be used in termite baiting systems to stimulate or increase feeding or otherwise attract termites and other wood-targeting pests.

Isolated blue-stain fungi may be used to treat (e.g., inoculate) wood substrate or a non-wood termite bait matrix to enhance the attractiveness of such wood or non-wood termite bait matrix. An example of a wood substrate is sapwood from a southern yellow pine tree.

In other embodiments, the blue-stain fungi is not isolated, but instead, wood that is already infested with blue-stain fungi is used as bait in a baiting system.

In still other embodiments, certain chemicals are extracted or synthesized from isolated or non-isolated blue-stain fungi and that extract is used to treat wood substrate or a non-wood termite bait matrix. Certain embodiments of the extract may be water soluble. Additional embodiments of the extract may be combined with other substances such as other available solvents or binders.

For purposes of this application, the term "blue-stained wood" will be used to refer to both wood that has been artificially inoculated with blue-stain fungi extract and wood that was naturally infested with blue-stain fungi.

Blue-stained wood is particularly suited for use as termite bait. Specifically, blue-stained wood has increased permeability relative to non-blue-stained wood. The permeability of the wood is increased as defensive barriers in longitudinal, tangential, and radial planes (such as occluded resin canals and pit membranes) are degraded by blue-stain fungi. The increase in wood permeability due to blue-stain infection therefore allows increased liquid transport across the grain, and subsequently greater penetration and retention of termiticides. Therefore, blue-stained wood—e.g., blue-stained sapwood—could be impregnated with various toxicant(s)/poison(s), ultimately increasing the amount of the toxicant consumed by the colony, thus improving the effectiveness of bait stations as stand-alone subterranean termite treatments.

Certain embodiments of blue-stained wood may be used, not only as bait positioned within the bait system, it also may be strategically positioned around the bait system to expand the area of influence. By increasing the area of influence of individual bait stations, the total number of bait stations required to adequately protect a wooden structure could be decreased, thus lowering the cost of control.

One advantage of certain embodiments of the present invention is that the blue-stain feeding stimulant is a non-decaying fungal product useful for termite control.

Another advantage of certain embodiments of the present invention is that the blue-stained wood can easily be milled into various configurations suitable for any existing or new bait systems or wood-targeting pest management systems, thereby increasing termite consumption of pesticide and decreasing damage to wood targets by termites. Blue-stained wood may be configured to be a part of an underground bait station, partially-underground bait station, or a completely aboveground bait station. Examples of existing bait systems include Smartdisk Termite Locators, Advance Termite Bait Station, FirstLine GT Plus Termite Bait Station by FMC, Hex Pro Termite Bait Station, Sentricon bait station by Dow, Exterra bait station by Ensystex, Subterfuge bait station and Advance bait station by BASF, and Spectracide Terminate bait station.

Another advantage of certain embodiments of the present invention is that the blue-stain fungi extract can be mixed with other substances to form a blue-stain treatment for non-wood bait that will be positioned relative to a bait system or other wood-targeting pest management system. Other substances include available solvents or binders.

Another advantage of certain embodiments of the present invention is that the blue-stained bait unit can be used in conjunction with any type of pesticide or insecticide, including liquids and foams.

Another advantage of certain embodiments of the present invention is that the blue-stained wood can easily be milled into various configurations suitable specifically for any subterranean termite bait stations.

Another advantage of certain embodiments of the present invention is that the blue-stain feeding stimulant/attractant elicits higher consumption rates from termites than those observed for the currently available termite attractants, including brown-rot fungi.

Another advantage of certain embodiments of the present invention is that a blue-stained wood may preferentially attract and kill any subterranean termite colonies already present around a wood structure and wood products without attracting pests from a far distance.

Another advantage of certain embodiments of the present invention is that blue-stained wood is a renewable resource, which exists as a consequence of native pests—specifically, the bark beetle. It does not need to be manufactured or refined from raw materials using harsh chemicals or additional processing methods (e.g., pulping), such as those used in some commercially available termite bait systems. The use of minimally processed natural resources greatly decreases the carbon footprint for manufacturers and consumers.

Another advantage of certain embodiments of the present invention is that the natural, minimally processed blue-stained wood bait may be used in conjunction with "green" plant-derived termiticide, resulting in a bait station with low non-pest toxicity.

Another advantage of certain embodiments of the present invention is that, because certain types of blue-stained wood may be less desirable for non-pest control uses than other types of wood, it may be available at a lower cost and accordingly result in a more cost effective bait station.

Another advantage of certain embodiments of the present invention is that it creates a new market for bark-beetle infested wood.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to the limit the invention, where like designations denote like elements, and in which:

FIG. 2 is a method embodiment of the present invention

DETAILED DESCRIPTION OF EMBODIMENTS OF THE INVENTION

As described above, subterranean termites are one of the most destructive pests of wooden structures in the world, costing property owners billions of dollars annually in control and replacement costs. Bait systems, such as bait stations, may be used to protect wooden structures from subterranean termite degradation. Bait stations are placed in the soil around structures to intercept subterranean termites and offer a sacrificial food source, which can be used to monitor for termite presence, or treated with a slow acting insecticide to act as a control. Wood is often the sacrificial feeding attractant of choice used to entice randomly foraging subterranean termites to the bait stations. Termite workers feed on the wood bait and any chemicals it may contain while recruiting other termites to the site. Termite workers feed other castes of termites within the colony, which slowly die off after ingesting the toxicant. If the "attractiveness" or the consumption rate of a bait source within termite bait stations can be increased, consumption of the toxicant contained within is increased, ultimately improving the effectiveness of the bait station, and the home/building is better protected against subterranean termites. Blue-stained wood or any compounds or chemicals derived from blue-stained wood act as a feeding stimulant and attractant to increase termite feeding, thereby promoting the effectiveness of insecticides from termite bait stations and other termite baiting systems.

Figure 1A:
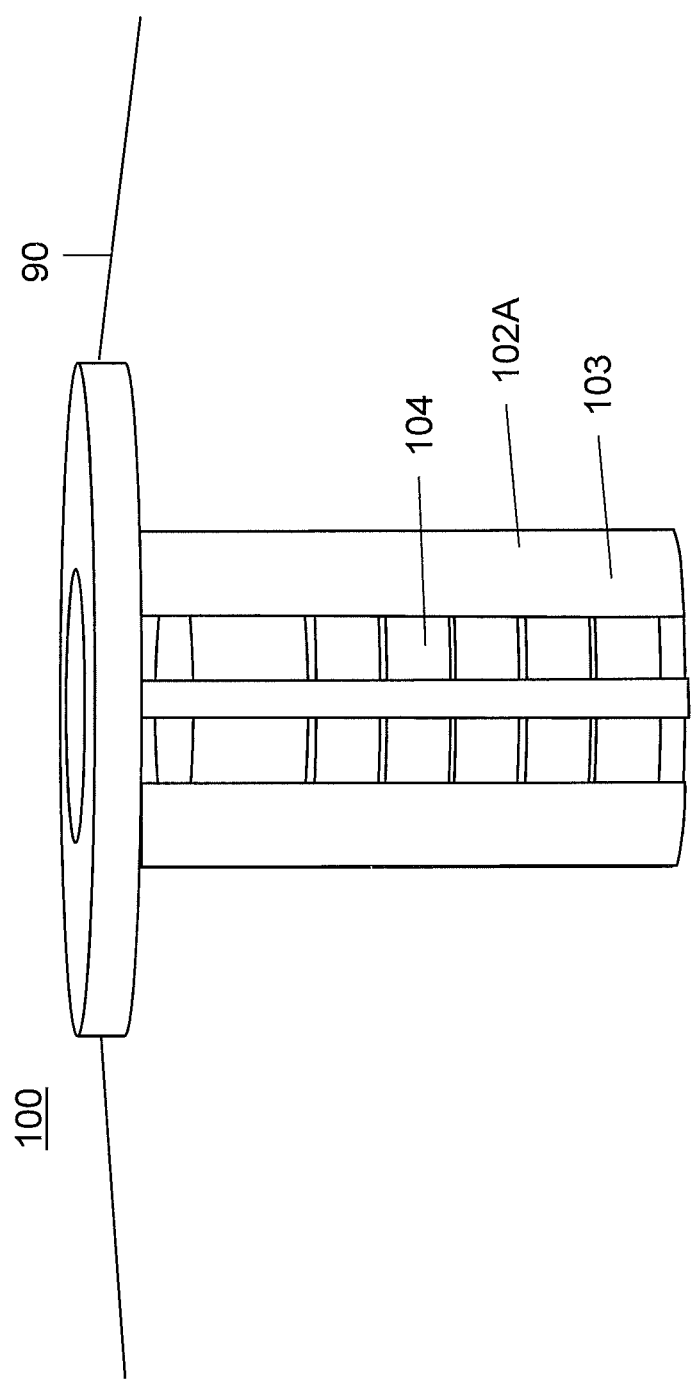
FIG. 1A is an embodiment of a subterranean wood-targeting pest bait system of the present invention.
Figure 1B:
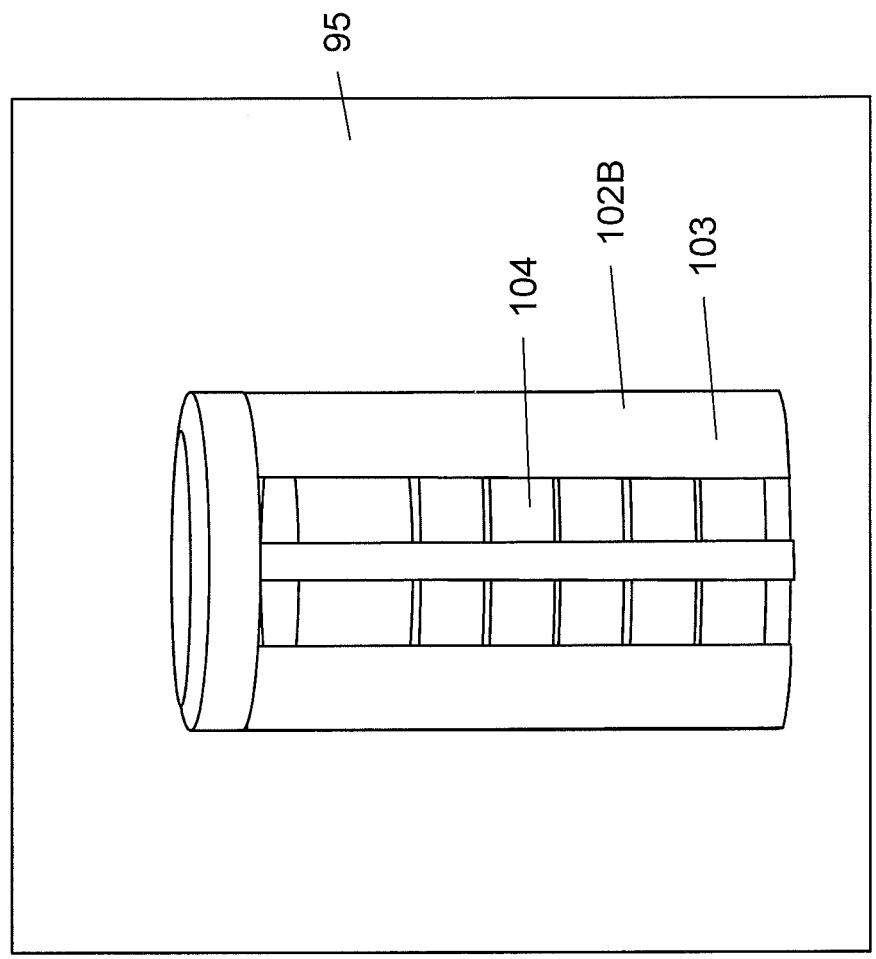
FIG. 1B is an embodiment of an aboveground wood-targeting pest bait system of the present invention.

Certain system embodiments 100 of the present invention include a wood-targeting pest bait system 102. A wood-targeting pest bait system 102 may include a subterranean bait system 102A configured to be positioned under the ground 90 as illustrated in FIG. 1A. Alternatively, a wood-targeting pest bait system 102 may include an aboveground bait system 102B, e.g., wall-mounted bait system configured to be mounted on a wall 95 as illustrated in FIG. 1B. Each bait system 102 may include a housing 103 and a blue-stained bait unit 104. The housing 103 may be configured to enclose at least a portion of the blue-stained bait unit 104. The blue-stained bait unit 104 may include sapwood naturally infected with blue-stain fungi, sapwood treated with blue-stain fungi, or a bait station matrix treated with blue-stain fungi.

In the treated embodiments of bait unit, the blue-stain fungi may be pure blue-stain fungi, blue-stain fungi in a solution with a solvent, or an extract from a blue-stain fungi extract (e.g., any isolated portion of blue-stain fungi).

While the disclosure is susceptible to various modifications and alternative forms, specific exemplary embodiments of the present invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A method of attracting wood-targeting pests, comprising the steps of:
    identifying a carrier of an ophiostomatoid fungus, wherein the ophiostomatoid fungus is a non-wood decaying fungus and that attracts wood-targeting pests;
    obtaining a sample of the ophiostomatoid fungus from the carrier; and using the sample of the ophiostomatoid fungus to attract wood-targeting pests.

2. The method of claim 1, wherein the carrier of the ophiostomatoid fungus is one selected from the following group: a bark beetle, a root-feeding weevils, a phoretic mite, and from an infected wood tissue.

3. The method of claim 1, wherein the using step further comprises the step of using the sample of the ophiostomatoid fungus to stimulate feeding by wood-targeting pests.

4. The method of claim 1 further comprising the step of inoculating a bait unit substrate with the ophiostomatoid fungus, wherein the bait unit substrate is one selected from the following group: a non-wood substrate, a wood substrate, and a wood derivative.

5. The method of claim 4 further comprising the steps of:
   placing the bait unit substrate in a bait system; and
   positioning the bait system near a wood target.

6. The method of claim 1 further comprising the step of combining the sample of the ophiostomatoid fungus with a solvent to form a solution.

7. The method of claim 1 further comprising the step of separating an extract from the ophiostomatoid fungus.

8. The method of claim 1, further comprising the step of isolating the ophiostomatoid fungus.

9. The method of claim 1, further comprising the steps of growing a pure culture of the ophiostomatoid fungus.

10. The method of claim 1, further comprising the step of adding a toxicant for consumption by the wood-targeting pests.

\* \* \* \* \*